United States Patent
Mellet et al.

(10) Patent No.: US 8,944,949 B2
(45) Date of Patent: Feb. 3, 2015

(54) MULTI-SPEED TRANSMISSION WITH INTEGRATED ELECTRIC MOTOR

(75) Inventors: Edward W. Mellet, Rochester Hills, MI (US); James M. Hart, Belleville, MI (US); James B. Borgerson, Clarkston, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 332 days.

(21) Appl. No.: 13/312,471

(22) Filed: Dec. 6, 2011

(65) Prior Publication Data

US 2012/0214633 A1    Aug. 23, 2012

Related U.S. Application Data

(60) Provisional application No. 61/444,050, filed on Feb. 17, 2011.

(51) Int. Cl.
| | |
|---|---|
| *F16H 3/72* | (2006.01) |
| *F16H 37/06* | (2006.01) |
| *B60K 6/365* | (2007.10) |
| *B60K 6/48* | (2007.10) |
| *B60K 6/547* | (2007.10) |

(52) U.S. Cl.
CPC . *B60K 6/365* (2013.01); *B60K 6/48* (2013.01); *B60K 6/547* (2013.01); *F16H 3/725* (2013.01); *B60K 2006/4816* (2013.01); *F16H 2200/0065* (2013.01); *F16H 2200/2012* (2013.01); *F16H 2200/2046* (2013.01); *Y02T 10/6221* (2013.01); *Y02T 10/6256* (2013.01); *Y02T 10/6247* (2013.01)

USPC .................................. 475/5; 475/4; 475/10

(58) Field of Classification Search
CPC ............... F16H 2200/0021; F16H 2200/2012; F16H 2200/2046
USPC .................................... 475/1–5, 10
See application file for complete search history.

(56) References Cited

U.S. PATENT DOCUMENTS

| | | | |
|---|---|---|---|
| 6,176,803 B1 | 1/2001 | Meyer et al. | |
| 6,984,187 B2 | 1/2006 | Biermann | |
| 6,991,578 B2 | 1/2006 | Ziemer | |
| 7,011,597 B2 | 3/2006 | Haka | |
| 7,018,319 B2 | 3/2006 | Ziemer | |
| 8,187,130 B1 * | 5/2012 | Mellet et al. | 475/5 |
| 8,287,411 B2 * | 10/2012 | Lee et al. | 475/5 |
| 8,602,934 B2 * | 12/2013 | Mellet et al. | 475/5 |
| 2010/0048345 A1 * | 2/2010 | Boss et al. | 475/275 |
| 2010/0069196 A1 * | 3/2010 | Shibata et al. | 477/3 |

* cited by examiner

*Primary Examiner* — Tisha Lewis

(57) ABSTRACT

An automatic transmission includes an input shaft or member, an output shaft or member and three simple and one compound planetary gear assemblies each including a sun gear, a planet gear carrier with a plurality of planet gears and a ring gear. The input shaft or member is coupled to the sun gear of the second planetary gear assembly and the output shaft is coupled to the planet gear carrier of the fourth planetary gear assembly. An electric motor is coupled to and drives the sun gear of the fourth planetary gear assembly. The transmission also includes six torque transmitting devices: four friction brakes and two friction clutches.

19 Claims, 2 Drawing Sheets

| GEAR STATE | BRAKES | | | | CLUTCHES | |
|---|---|---|---|---|---|---|
| | 62 | 64 | 66 | 68 | 74 | 72 |
| REV | X | | | X | | |
| N | | | | O | | |
| 1ST | | X | | X | | |
| 2ND | | | | X | | X |
| 3RD | | X | | | | X |
| 4TH | | | X | | | X |
| 5TH | X | | | | | X |
| 6TH | | | | | X | X |
| 7TH | X | | | | X | |
| 8TH | | | X | | X | |
| 9TH | | X | | | X | |

X = ON - ENGAGED CARRYING TORQUE
O = ON - ENGAGED NOT CARRYING TORQUE

US 8,944,949 B2

MULTI-SPEED TRANSMISSION WITH INTEGRATED ELECTRIC MOTOR

CROSS REFERENCE TO RELATED APPLICATION

This patent application claims the benefit of U.S. Provisional Patent Application Ser. No. 61/444,050, filed Feb. 17, 2011, which is hereby incorporated in its entirety herein by reference.

FIELD

The present disclosure relates to a multiple speed automatic transmission and more particularly to a multiple speed automatic transmission having an integrated electric motor.

BACKGROUND

The statements in this section merely provide background information related to the present disclosure and may or may not constitute prior art.

A typical modern multiple speed automatic transmission includes a plurality of planetary gear assemblies and selectively engaged friction clutches and brakes that achieve a plurality of forward speeds or gear ratios and reverse.

Increasingly demanding economic, performance and efficiency goals continue to encourage powertrain research and development. A result of this effort has been improvements relating to hybrid powertrains having automatic transmissions. The addition of electric motors to vehicle powertrains has multiplied engineering and design choices.

Whereas some electric motors are of relatively low power and function in supplemental or auxiliary and regenerative roles, others provide full operating power which may or may not be supplemented by another power source such as a small internal combustion engine.

In modern motor vehicle transmissions, the elements of a plurality of planetary gear assemblies are (1) connected by permanent coupling members, (2) selectively connected by friction clutches or (3) selectively grounded by friction brakes. Specific combinations of the clutches and brakes are engaged or activated in sequence to provide a predetermined sequence of numerically related gear ratios and thus output speeds and torques.

Due to the sophistication, performance and flexibility of such devices, they often become the basis of hybrid powertrains. The present invention relates to a four planetary gear assembly automatic transmission incorporating an electric motor.

SUMMARY

The present invention provides a multiple speed automatic transmission having an electric motor. The automatic transmission includes an input shaft or member, an output shaft or member and three simple and one compound planetary gear assemblies each including a sun gear, a planet gear carrier with a plurality of planet gears and a ring gear. The input shaft or member is coupled to the sun gear of the second planetary gear assembly and the output shaft is coupled to the planet gear carrier of the fourth planetary gear assembly. The electric motor is coupled to and drives the sun gear of the fourth planetary gear assembly. The transmission also includes six torque transmitting devices: four friction brakes and two friction clutches.

The transmission further includes a plurality of fixed or rigid connections between the various components. A first connection couples the ring gear of the first planetary gear assembly to the ring gear of the second planetary gear assembly. A second connection couples the planet gear carrier of the first planetary gear assembly to the planet gear carrier of the second planetary gear assembly. A third connection couples the planet gear carrier of the second planetary gear assembly to the sun gear of the third planetary gear assembly. A fourth connection couples the planet gear carrier of the third planetary gear assembly to the ring gear of the fourth planetary gear assembly. A fifth connection couples the ring gear of the third planetary gear assembly to the planet gear carrier of the fourth planetary gear assembly. A sixth connection couples the sun gear of the first planetary gear assembly to a friction brake. In certain layouts of the planetary gear assemblies, one or more of the connections may be achieved by an integral or common component, thereby essentially eliminating a shaft, quill or other fixed or rigid connecting member.

Thus it is an aspect of the present invention to provide a multiple speed automatic transmission.

It is a further aspect of the present invention to provide a nine speed automatic transmission.

It is a still further aspect of the present invention to provide an automatic transmission having three simple and one compound planetary gear assemblies.

It is a still further aspect of the present invention to provide an automatic transmission having an electric motor coupled to one element of a planetary gear assembly.

It is a still further aspect of the present invention to provide an automatic transmission having an electric motor coupled to a sun gear of a planetary gear assembly.

It is a still further aspect of the present invention to provide an automatic transmission having an electric motor coupled to a sun gear of a fourth planetary gear assembly.

It is a still further aspect of the present invention to provide an automatic transmission having four friction brakes and two friction clutches.

It is a still further aspect of the present invention to provide an automatic transmission having a plurality of fixed connections between components of the transmission.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
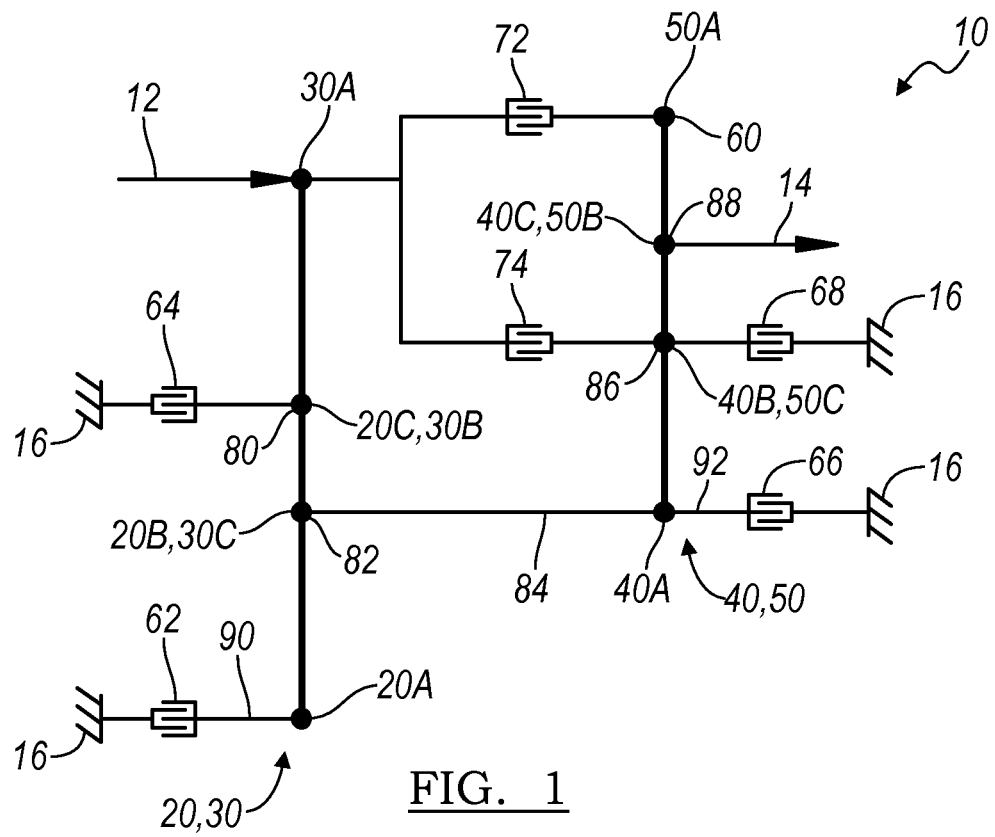
FIG. 1 is a lever diagram of a nine speed automatic transmission according to the present invention having two four node levers.

With reference to FIG. 1, a multiple, i.e., nine, speed automatic transmission 10 according to the present invention is illustrated in a lever diagram. A lever diagram is a schematic representation of the components of an automatic transmission wherein a planetary gear assembly is represented by a vertical bar or lever and the components of the planetary gear assemblies such as sun gears, planet gear carriers and ring gears are represented by nodes. The relative lengths of the vertical bars between the nodes represent the ratios between the components. Where a component of one planetary gear assembly is coupled directly to a component of another planetary gear assembly, two levers may be combined into a single lever having, in this instance, four nodes. Because of such direct coupling, the four planetary gear assemblies of the present invention are represented by only two vertical bars or levers. Mechanical couplings or interconnections between the nodes of the planetary gear assemblies are also represented by horizontal lines and torque transmitting devices such as friction clutches and brakes are represented by interleaved or nested fingers and band brakes are represented by nested circles. Further explanation of the format, purpose and use of lever diagrams can be found in SAE Paper No. 810102 entitled, "The Lever Analogy: A New Tool in Transmission Analysis" by Benford and Leising which is fully incorporated herein by reference.

The multiple speed automatic transmission 10 includes an input shaft or member 12 which receives drive torque, an output shaft or member 14 which delivers drive torque and a housing 16 which is referred to as "ground" with reference to FIG. 1. The automatic transmission 10 also includes four planetary gear assemblies. A first planetary gear assembly 20 includes a first node 20A, a second node 20B and a third node 20C. A second planetary gear assembly 30 includes a first node 30A which is coupled to and driven by the input shaft or member 12, a second node 30B which is common with the third node 20C of the first planetary gear assembly 20 and a third node 30C. A third planetary gear assembly 40 includes a first node 40A, a second node 40B and a third node 40C which is coupled to and drives the output shaft or member 14. Finally, a fourth planetary gear assembly 50 includes a first node 50A, a second node 50B which is common with the third node 40C of the third planetary gear assembly 40 and thus also drives the output shaft or member 14 and a third node 50C which is common with the second node 40B of the fourth planetary gear assembly 40. The output of an electric motor 60 which is preferably capable of both torque output, that is, providing drive torque, and regeneration, that is, energy absorption and conversion, is coupled to the first node 50A of the fourth planetary gear assembly 50.

Additionally, the automatic transmission 10 includes a plurality of selectively engageable torque transmitting devices, namely, brakes and clutches. As utilized herein, the term "friction brake" refers to any torque transmitting device having a first plurality of rotatable friction plates or discs which are interleaved with a second, stationary plurality of plates or discs and which are compressed by an associated operator or actuator to ground or brake the rotating plates or discs to the housing 16. The term "friction clutch" refers to a similar device in which the first and second pluralities of interleaved friction plates or discs transmit torque between two rotatable members. It should be understood, however, that other clutch types and configurations are within the purview of this invention.

A first friction brake 62 is operably disposed between the first node 20A of the first planetary gear assembly 20 and ground (the housing 16). A second friction brake 64 is operably disposed between the third node 20C of the first planetary gear assembly 20 (and the second node 30B of the second planetary gear assembly 30) and ground (the housing 16). A third friction brake 66 is operably disposed between the first node 40A of the third planetary gear assembly 40 and ground (the housing 16). A fourth friction brake 68 is operably disposed between the second node 40B of the third planetary gear assembly (and the third node 50C of the fourth planetary gear assembly 50) and ground (the housing 16).

A first friction clutch 72 is operably disposed between the first node 30A of the second planetary gear assembly 30 and the first node 50A of the fourth planetary gear assembly 50. A second friction clutch 74 is operably disposed between the first node 30A of the second planetary gear assembly 30 and the third node 50C of the fourth planetary gear assembly 50.

Figure 2:
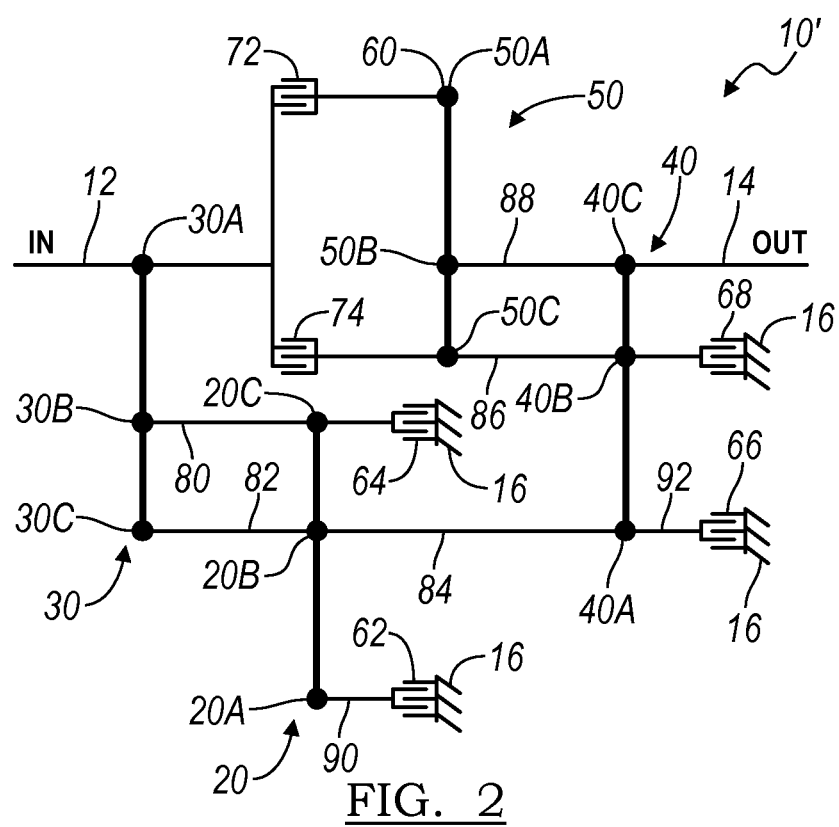
FIG. 2 is a lever diagram of a nine speed automatic transmission according to the present invention having four three node levers.
Figures 3, 4:
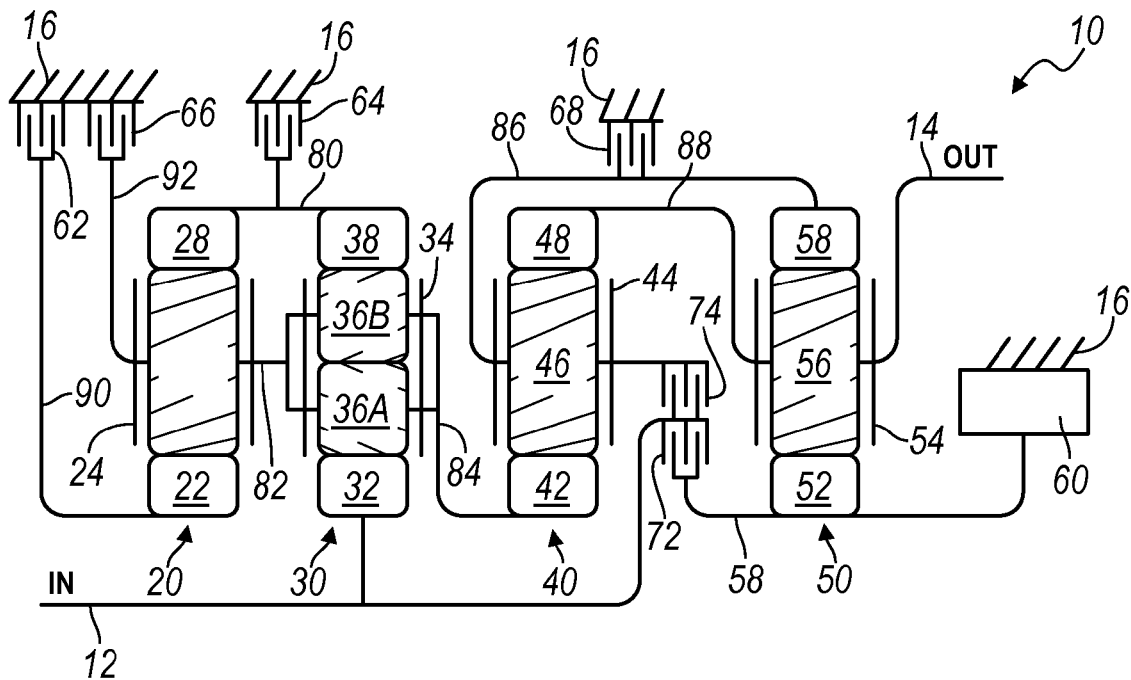
FIG. 3 is a stick diagram of an embodiment of a nine speed automatic transmission according to the present invention.
FIG. 4 is a truth table presenting the various combinations of engaged brakes and clutches which achieve a given forward or reverse gear or speed ratio and provide nine forward speeds and reverse in an automatic transmission according to the present invention.

Referring now to FIGS. 1 and 3, there are also a plurality of fixed, i.e., positive or direct, connections or couplings between various components of the planetary gear assemblies 20, 30, 40 and 50. Because the first planetary gear assembly 20 and the second planetary gear assembly 30 are combined in a single lever in FIG. 1 and the third planetary gear assembly 40 and the fourth planetary gear assembly 50 are also combined in a single lever in FIG. 1, many of the fixed connections are contained within or are integral components of certain nodes. Accordingly, many of the fixed connections are only clearly visible in FIGS. 2 and 3.

A first shaft, quill or member 80 connects the third node 20C of the first planetary gear assembly 20 to the second node 30B of the second planetary gear assembly 30. A second shaft, quill or member 82 connects the second node 20B of the first planetary gear assembly 20 to the third node 30C of the second planetary gear assembly 30. A third shaft, quill or member 84 connects the second node 20B of the first planetary gear assembly 20 (and the third node 30C of the second planetary gear assembly 30) to the first node 40A of the third planetary gear assembly 40. A fourth shaft, quill or member 86 connects the second node 40B of the third planetary gear assembly 40 to the third node 50C of the fourth planetary gear assembly 50. A fifth shaft, quill or member 88 connects the third node 40C of the third planetary gear assembly 40 to the second node 50B of the fourth planetary gear assembly 50. Because of the layout of the components in the automatic transmission 10, two additional fixed connections such as shafts, quills or members may be utilized. A sixth shaft, quill or member 90 connects the first friction brake 62 to the first node 20A of the first planetary gear assembly 20 and a seventh shaft, quill or member 92 connects the first node 40A of the third planetary gear assembly 40 (and the third node 30C of the second planetary gear assembly 30 and the first node 20A of the first planetary gear assembly 20 through the third shaft, quill or member 84) to the third friction clutch 66.

Referring now to FIG. 2, a lever diagram of an automatic transmission 10' according to the present invention having four three node levers is illustrated. The first planetary gear assembly 20 includes the first node 20A, the second node 20B and the third node 20C. The second planetary gear assembly 30 includes the first node 30A which is coupled to the input shaft or member 12, the second node 30B and the third node 30C. The third planetary gear assembly 40 includes the first node 40A, the second node 40B and the third node 40C which is coupled to and drives the output shaft or member 14.

Finally, the fourth planetary gear assembly 50 includes the first node 50A, the second node 50B and the third node 50C. The output of the electric motor 60 is coupled to the first node 50A of the fourth planetary gear assembly 50.

The automatic transmission 10' also includes a plurality of selectively engageable torque transmitting devices, namely, brakes and clutches. The first friction brake 62 is operably disposed between the first node 20A of the first planetary gear assembly 20 and ground (the housing 16). The second friction brake 64 is operably disposed between the third node 20C of the first planetary gear assembly 20 and ground (the housing 16). The third friction brake 66 is operably disposed between the first node 40A of the third planetary gear assembly 40 and ground (the housing 16). The fourth friction brake 68 is operably disposed between the second node 40B of the third planetary gear assembly 40 and ground (the housing 16).

The first friction clutch 72 is operably disposed between the first node 30A of the second planetary gear assembly 30 and the first node 50A of the fourth planetary gear assembly 50. The second friction clutch 74 is operably disposed between the first node 30A of the second planetary gear assembly 30 and the third node 50C of the fourth planetary gear assembly 50.

The first shaft, quill or member 80 connects the third node 20C of the first planetary gear assembly 20 to the second node 30B of the second planetary gear assembly 30. The second shaft, quill or member 82 connects the second node 20B of the first planetary gear assembly 20 to the third node 30C of the second planetary gear assembly 30. The third shaft, quill or member 84 connects the second node 20B of the first planetary gear assembly 20 to the first node 40A of the third planetary gear assembly 40. A fourth shaft, quill or member 86 connects the second node 40B of the third planetary gear assembly 40 to the third node 50C of the fourth planetary gear assembly 50. A fifth shaft, quill or member 88 connects the third node 40C of the third planetary gear assembly 40 to the second node 50B of the fourth planetary gear assembly 50. Because of the layout of the components in the automatic transmission 10, two additional fixed connections such as shafts, quills or members may be utilized. A sixth shaft, quill or member 90 connects the first friction brake 62 to the first node 20A of the first planetary gear assembly 20 and a seventh shaft, quill or member 92 connects the first node 40A of the third planetary gear assembly 40 to the third friction clutch 66.

In FIG. 3, the levers have been replaced by three simple and one compound planetary gear assemblies 20, 30, 40, and 50 and the nodes 20A, 20B, 20C, 30A, 30B, 30C, 40A, 40B, 40C, 50A, 50B and 50C have been replaced by the components of the planetary gear assemblies: sun gears, planetary gear carriers having planet gears and ring gears. Thus, the first, simple planetary gear assembly 20 includes a first sun gear 22, a first planet gear carrier 24 and a first ring gear 28. Rotatably disposed in the first planet gear carrier 24 are a first plurality of planet gears 26, one of which is illustrated in FIG. 3. Each of the first plurality of planet gears 26 is in constant mesh with the first sun gear 22 and the first ring gear 28. The second, compound planetary gear assembly 30 includes a second sun gear 32, a second planet gear carrier 34 and a second ring gear 38. Rotatably disposed in the second planet gear carrier 34 on stub shafts and/or bearings (not illustrated) are a first plurality of second planet gears 36A, one of which is illustrated in FIG. 3, which are in constant mesh with a respective one of a second plurality of second planet gears 36B, one of which is illustrated in FIG. 3. Each of the first plurality of second planet gears 36A is in constant mesh with the second sun gear 32 and each of the second plurality of second planet gears 36B is in constant mesh with the second ring gear 38.

The third, simple planetary gear assembly 40 includes a third sun gear 42, a third planet gear carrier 44 and a third ring gear 48. Rotatably disposed in the third planet gear carrier 44 on stub shafts and/or bearings (not illustrated) are a plurality of third planet gears 46, one of which is illustrated in FIG. 3. Each of the plurality of third planet gears 46 is in constant mesh with the third sun gear 42 and the third ring gear 48. The fourth, simple planetary gear assembly 50 includes a fourth sun gear 52 which is coupled to and drives or is driven by the output of the electric motor 60, a fourth planet gear carrier 54 and a fourth ring gear 58. Rotatably disposed in the fourth planet gear carrier 54 on stub shafts and/or bearings (not illustrated) are a plurality of fourth planet gears 56, one of which is illustrated in FIG. 3. Each of the plurality of fourth planet gears 56 is in constant mesh with the fourth sun gear 52 and the fourth ring gear 58.

The first friction brake 62 is connected between the housing 16 and the first sun gear 22 of the first planetary gear assembly 20 by the sixth shaft, quill or member 90. The second friction brake 64 is connected between the housing 16 and the first ring gear 28 of the first planetary gear assembly 20 and the second ring gear 38 of the second planetary gear assembly 30 by the first shaft, quill or member 80. The third friction brake 66 is connected between the housing 16 and the first planet gear carrier 24 of the first planetary gear assembly 20 by the seventh shaft, quill or member 92 and to the second planet gear carrier 34 of the second planetary gear assembly 30 by the second shaft, quill or member 82. The fourth friction brake 68 is connected between the housing 16 and the third planet gear carrier 44 of the third planetary gear assembly 40 and the fourth ring gear 58 of the fourth planetary gear assembly 50 by the fourth shaft, quill or member 86.

The input shaft 12 is connected to and drives the second sun gear 32 of the second planetary gear assembly 30, the first friction clutch 72 and the second friction clutch 74. The first friction clutch 72 is also connected to the fourth sun gear 52 of the fourth planetary gear assembly 50 and the output of the electric motor 60. The second friction clutch 74 is connected to the third planet gear carrier 44 of the third planetary gear assembly 40 and to the fourth ring gear 58 of the fourth planetary gear assembly 50 by the fourth shaft, quill or member 86.

The second shaft, quill or member 82 connects the first planet gear carrier 24 of the first planetary gear assembly 20 to the second planet gear carrier 34 of the second planetary gear assembly 30. The third shaft, quill or member 84 connects the second planet gear carrier 34 of the second planetary gear assembly 30 to the third sun gear 42 of the third planetary gear assembly 40. The fifth shaft, quill or member 88 connects the third ring gear 48 of the third planetary gear assembly 40 to the fourth planetary gear carrier 54 of the fourth planetary gear assembly 50 which is also connected to the output shaft 14.

Referring now to FIG. 4, the sequence of operation, i.e., the activation or engagement, of the six torque transmitting devices, which provides nine forward speeds or gear ratios and reverse is illustrated. FIG. 4 is a truth table which presents the various combinations of brakes and clutches that are activated or engaged to achieve nine forward speeds and reverse. An "X" appearing in a column indicates activation or engagement if the subject brake or clutch and that the device is carrying torque. An "O" appearing in a column indicates that the subject brake or clutch is activated or engaged but that it is not carrying torque. No entry in a column indicates that the subject brake or clutch is inactive or disengaged. The actual gear ratios and ratio steps may be adjusted or varied over significant ranges to accommodate various applications and operational criteria of the automatic transmissions 10 and 10'.

To engage reverse, referred to in FIG. 4 as "Rev," the first friction brake 62 and the fourth friction brake 68 are engaged or activated. In neutral, referred to by the letter "N" in FIG. 4, only the fourth friction brake 68 is engaged or activated but it is not carrying torque.

First gear is achieved by activating or engaging the second friction brake 64 while maintaining activation or engagement of the fourth friction brake 68. Second gear is achieved by deactivating or disengaging the second friction brake 64 and activating or engaging the first friction clutch 72 while maintaining activation or engagement of the fourth friction brake 68.

Third gear is achieved by deactivating or disengaging the fourth friction brake 68 and engaging or activating the second friction brake 64 while maintaining activation or engagement of the first friction clutch 72. Fourth gear is achieved by deactivating or disengaging the second friction brake 64 and engaging or activating the third friction brake 66 while maintaining engagement of the first friction clutch 72.

Fifth gear is achieved by deactivating or disengaging the third friction brake 66 and engaging or activating the first friction brake 62 while maintaining engagement of the first friction clutch 72. Sixth gear is achieved by deactivating or disengaging the first friction brake 62 and engaging or activating the second friction clutch 74 while maintaining engagement of the first friction clutch 72.

Seventh gear is achieved by deactivating or disengaging the first friction clutch 72 and engaging or activating the first friction brake 62 while maintaining engagement of the second friction clutch 74. Eighth gear is achieved by deactivating or disengaging the first friction brake 62 and engaging or activating the third friction brake 66 while maintaining engagement of the second friction clutch 74. Ninth gear is achieved by deactivating or disengaging the third friction brake 66 and activating or engaging the second friction brake 64 while maintaining engagement of the second friction clutch 74.

Several performance advantages and operational efficiencies are enjoyed by the automatic transmission 10 of the present invention. At the outset, however, it should be noted that the electric motor 60 should be coupled to and drive the first node 50A of the fourth planetary gear assembly 50 (the fourth sun gear 52) in order to maximize its benefits. The electric motor 60 can be utilized to provide regenerative braking independent of engine speed if both the first friction clutch 72 and the second friction clutch 74 are open (deactivated). The electric motor 60 can be utilized to directly augment the amount of torque added to or subtracted from the output. This enables an electric slewing of the output speeds in EVT (hybrid) operating modes. The electric motor 60 can be utilized to smooth output torque during shifts. This is a highly beneficial feature because output torque and its effect on vehicle acceleration is what a driver senses. By applying the fourth friction clutch 68, the output shaft 14 of the transmission 10 can be driven independently of the remainder of the transmission which would allow the hydraulic pump to be shut off in some conditions. By incorporating and applying an engine disconnect clutch (not illustrated) between the transmission input shaft 12, the output shaft of the engine and one of the friction clutches, the electric motor 60 can be utilized to start the engine. Last of all, it should be understood that the automatic transmission 10 can operate as a stand-alone, conventional nine speed transmission.

The description of the invention is merely exemplary in nature and variations that do not depart from the gist of the invention are intended to be within the scope of the invention. Such variations are not to be regarded as a departure from the spirit and scope of the invention.

What is claimed is:

1. A multiple speed automatic transmission comprising, in combination,
    a first, a second, a third and a fourth planetary gear assembly, each of said planetary gear assemblies having three components,
    an input member connected to a first component of said second planetary gear assembly,
    an output member connected to a first component of said fourth planetary gear assembly,
    a first component of said first planetary gear assembly coupled to a second component of said second planetary gear assembly,
    a second component of said first planetary gear assembly coupled to a third component of said second planetary gear assembly,
    said third component of said second planetary gear assembly coupled to a first component of said third planetary gear assembly,
    a second component of said third planetary gear assembly coupled to a second component of said fourth planetary gear assembly,
    a third component of said third planetary gear assembly coupled to said first component of said fourth planetary gear assembly,
    a electric motor having an output connected to a third component of said fourth planetary gear assembly, and
    a plurality of torque transmitting devices selectively engageable to connect: a third component of said first planetary gear assembly to ground, said first component of said first planetary gear assembly and said second component of said second planetary gear assembly to ground, said second component of said first planetary gear assembly to ground, said second component of said third planetary gear assembly and said second component of said fourth planetary gear assembly to ground, said input member to said second component of said third planetary gear assembly and said input member to said third component of said fourth planetary gear assembly.

2. The multiple speed automatic transmission of claim 1 wherein each of said three components of said first, second, third and fourth planetary gear assemblies is one of a sun gear, a ring gear and a planet gear carrier.

3. The multiple speed automatic transmission of claim 1 wherein said first component of said first planetary gear assembly is a ring gear, said second component of said first planetary gear assembly is a planet gear carrier and said third component of said first planetary gear assembly is a sun gear.

4. The multiple speed automatic transmission of claim 1 wherein said second planetary gear assembly is a compound planetary gear assembly and said first component of said second planetary gear assembly is a sun gear, said second component of said second planetary gear assembly is a ring gear and said third component of said second planetary gear assembly is a planet gear carrier.

5. The multiple speed automatic transmission of claim 1 wherein said first component of said third planetary gear assembly is a sun gear, said second component of said third planetary gear assembly is a planet gear carrier and said third component of said third planetary gear assembly is a ring gear.

6. The multiple speed automatic transmission of claim 1 wherein said first component of said fourth planetary gear assembly is a planet gear carrier, said second component of said fourth planetary gear assembly is a ring gear and said third component of said fourth planetary gear assembly is a sun gear.

7. A multiple speed automatic transmission comprising, in combination,
- a first, a second, a third and a fourth planetary gear assembly, each of said planetary gear assemblies having a first component, a second component and a third component,
- an input member connected to said first component of said second planetary gear assembly,
- an output member connected to said first component of said fourth planetary gear assembly,
- a first member for connecting said first component of said first planetary gear assembly with said second component of said second planetary gear assembly,
- a second member for connecting said second component of said first planetary gear assembly with said third component of said second planetary gear assembly,
- a third member for connecting said third component of said second planetary gear assembly with said first component of said third planetary gear assembly,
- a fourth member for connecting said second component of said third planetary gear assembly with said second component of said fourth planetary gear assembly,
- a fifth member for connecting said third component of said third planetary gear assembly with said first component of said fourth planetary gear assembly,
- a electric motor having an output connected to said third component of said fourth planetary gear assembly, and
- a plurality of torque transmitting devices selectively engageable to connect: said third component of said first planetary gear assembly to ground, said first connecting member to ground, said second component of said first planetary gear assembly to ground, said fourth connecting member to ground, said input member to said third component of said fourth planetary gear assembly and said input member to said second component of said third planetary gear assembly.

8. The multiple speed automatic transmission of claim 7 wherein a first group of said plurality of torque transmitting devices are brakes and a second group of said plurality of torque transmitting devices are clutches.

9. The multiple speed automatic transmission of claim 7 wherein each of said first, second and third components of said first, second, third and fourth planetary gear assemblies is one of a sun gear, a ring gear and a planet gear carrier.

10. The multiple speed automatic transmission of claim 7 wherein said first component of said first planetary gear assembly is a ring gear, said second component of said first planetary gear assembly is a planet gear carrier and said third component of said first planetary gear assembly is a sun gear.

11. The multiple speed automatic transmission of claim 7 wherein said first component of said second planetary gear assembly is a sun gear, said second component of said second planetary gear assembly is a ring gear and said third component of said second planetary gear assembly is a planet gear carrier.

12. The multiple speed automatic transmission of claim 7 wherein said first component of said third planetary gear assembly is a sun gear, said second component of said third planetary gear assembly is a planet gear carrier and said third component of said third planetary gear assembly is a ring gear.

13. The multiple speed automatic transmission of claim 7 wherein said first component of said fourth planetary gear assembly is a planet gear carrier, said second component of said fourth planetary gear assembly is a ring gear and said third component of said fourth planetary gear assembly is a sun gear.

14. The multiple speed automatic transmission of claim 7 wherein said second planetary gear assembly is a compound planetary gear assembly.

15. A multiple speed automatic transmission comprising, in combination,
- an input member,
- an output member,
- a first planetary gear assembly having a sun gear, a planet gear carrier rotatably supporting a plurality of planet gears and a ring gear,
- a second planetary gear assembly having a sun gear coupled to and driven by said input member, a planet gear carrier coupled to said planet gear carrier of said first planetary gear assembly and rotatably supporting a plurality of planet gears and a ring gear coupled to said ring gear of said first planetary gear assembly,
- a third planetary gear assembly having a sun gear coupled to said planet gear carrier of said second planetary gear assembly, a planet gear carrier rotatably supporting a plurality of planet gears and a ring gear,
- a fourth planetary gear assembly having a sun gear, a planet gear carrier coupled to and driving said output member, coupled to said ring gear of said third planetary gear assembly and rotatably supporting a plurality of planet gears and a ring gear coupled to said planet gear carrier of said third planetary gear assembly, and
- an electric motor having an output member coupled to said sun gear of said fourth planetary gear assembly.

16. The multiple speed automatic transmission of claim 15 further including a first friction brake disposed between said sun gear of said first planetary gear assembly and a housing, a second friction brake disposed between said ring gears of said first and said second planetary gear assemblies and said housing, a third friction brake disposed between said planet gear carrier of said first planetary gear assembly and said housing, and a fourth friction brake disposed between said planet gear carrier of said third planetary gear assembly and said ring gear of said fourth planetary gear assembly and said housing.

17. The multiple speed automatic transmission of claim 15 further including a first friction clutch disposed between said input member and said sun gear of said fourth planetary gear assembly and a second friction clutch disposed between said input member and said planet gear carrier of said third planetary gear assembly.

18. The multiple speed automatic transmission of claim 15 wherein said first, third and fourth planetary gear assemblies are simple planetary gear assemblies and said second planetary gear assembly is a compound planetary gear assembly.

19. The multiple speed automatic transmission of claim 15 wherein said electric motor may also function as a generator.

* * * * *